No. 720,122. PATENTED FEB. 10, 1903.
J. B. ESPEY.
METHOD OF PREPARING CEREAL FOOD PRODUCTS.
APPLICATION FILED FEB. 13, 1902.
NO MODEL.
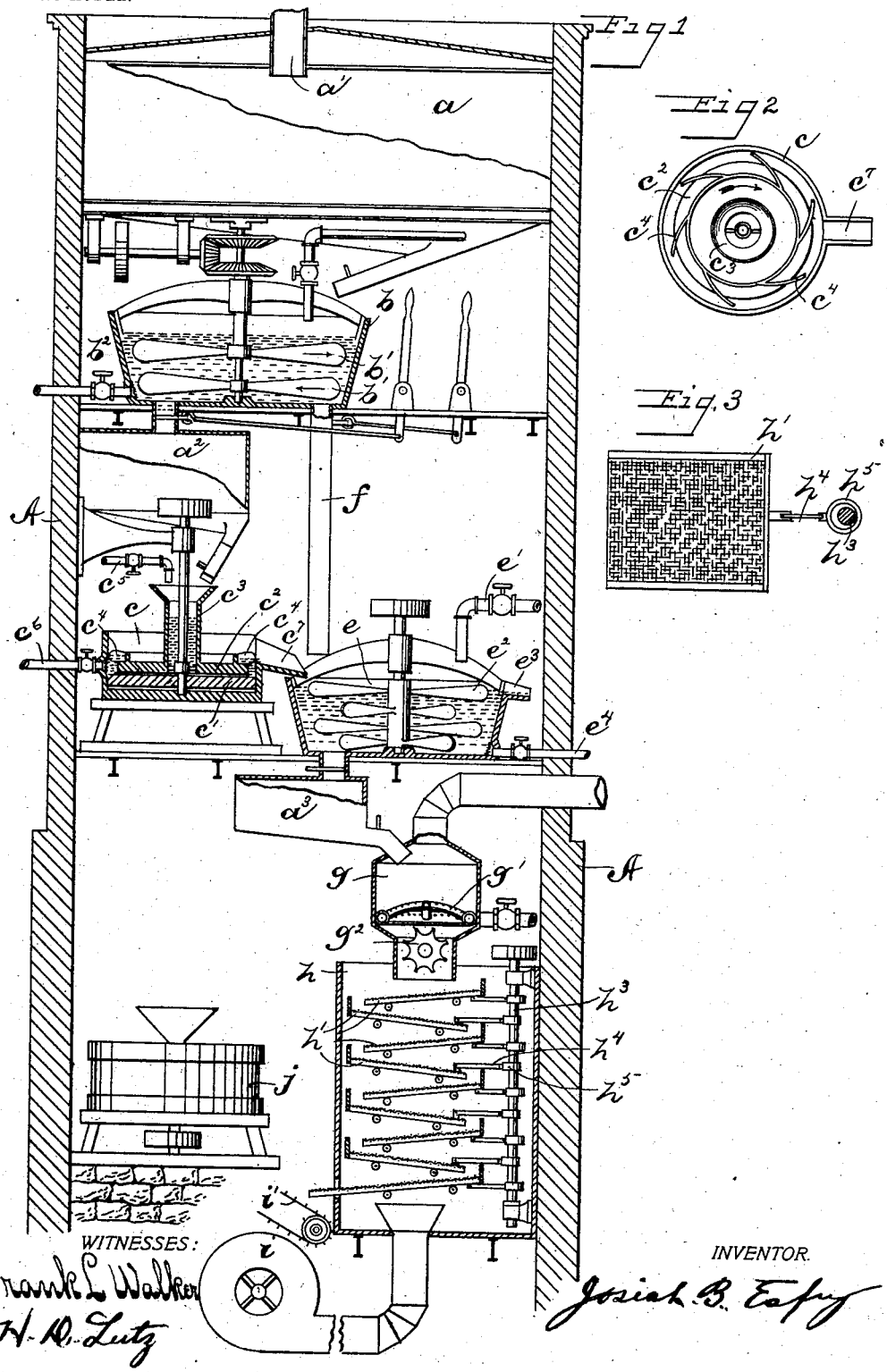

UNITED STATES PATENT OFFICE.

JOSIAH B. ESPEY, OF SPRINGFIELD, OHIO.

METHOD OF PREPARING CEREAL-FOOD PRODUCTS.

SPECIFICATION forming part of Letters Patent No. 720,122, dated February 10, 1903.

Application filed February 13, 1902. Serial No. 93,961. (No specimens.)

*To all whom it may concern:*

Be it known that I, JOSIAH B. ESPEY, a citizen of the United States, residing at Springfield, in the county of Clark and State of Ohio, (post-office address 222 West Main street,) have invented an Improved Method of Preparing Cereal-Food Products, of which the following is a specification.

My invention relates to a new method of preparing food products, especially to food products produced from cereal grains, whereby cooking of the product in its preparation is rendered unnecessary.

The object of the invention is to provide a method of preparing food products free from all impurities and germs and of such form that it may be conveniently packed for shipping and be prevented from deteriorating under varying climatic conditions.

My peculiar food product is the result of treating any of the well-known cereal grains, as oats, rye, wheat, corn, &c., in a manner hereinafter described.

In order that the various steps necessary to produce these food products may be more easily understood, reference is made to the drawings herewith, in which—

Figure 1 is a sectional view somewhat diagrammatic in nature of a building containing facilities for producing my improved food products. Fig. 2 is a plan view of the huller $c$, and Fig. 3 is a plan view of a drier-screen.

Like parts are represented by similar letters of reference throughout the several views.

In the drawings, A A represent the walls of a building devoted to the production of my improved articles of food.

$a$ is a grain bin or garner to which the grain is conveyed through a spout $a'$ from the grain-elevator. From this bin $a$ the grain is conducted to a vat $b$, where it is treated with a bath of non-poisonous germicidal purifying solution, preferably consisting of an alkaline bath containing a small amount of formaldehyde or a weak solution of formaldehyde alone. This solution removes the impurities, kills all animalcules, germs, &c. In order that the grain may be thoroughly and evenly treated, stirring arms or blades $b'$ are provided. These blades are adapted to be driven in opposite directions, as indicated by the arrows. After the treatment of the grain the solution is withdrawn through the pipe $b^2$, and the grain, cleansed of all impurities and minute organisms, is discharged into the bin or reservoir $a^2$. From here it is fed to a huller $c$. This huller consists of a bed-plate $c'$, above which, but not in contact therewith, is a revolving plate $c^2$, having a central opening surrounded by a hopper $c^3$. The upper side of the plate $c^2$ is provided with a series of radial arms $c^4$. As the grain is fed into the hopper $c^3$ sufficient liquid is admitted through the pipe $c^5$ to loosen the hull or bran, and the weight of the mixture in the hopper will cause it to pass between the revolving plate $c^2$ and the bed-plate $c'$, where it will be rubbed sufficiently to separate the hull from the edible portion of the grain, but not to mash or crush the grains. After the mixture has passed between these plates the overflow of liquid is allowed to pass off through the pipe $c^6$ and the grain is discharged through the spout $c^7$ into the vat $e$ by the action of the radial arms $c^4$, which revolve, as indicated by the arrow in Fig. 2. In the vat $e$ the grain is thoroughly washed in pure water, a constant stream of which flows from the pipe $e'$. During the washing of the grain it is agitated by the stirring-arms $e^2$. The free portions of hull, &c., being the lighter part, float to the top and are carried off by the overflow through the spout $e^3$. The water being drained from the vat by the pipe $e^4$, the grain is discharged into the reservoir $a^3$.

If desired, the grain may be conveyed direct from the vat $b$ to the vat $e$ by the conduit $f$ without passing through the huller $c$.

From the reservoir $a^3$ the grain is fed to a cooking-receptacle $g$, in which it is thoroughly cooked by steam from the perforated pipes $g'$. Other methods of cooking might be employed; but steam is preferred, because while it thoroughly cooks the material it also leaves the individual grains practically intact or whole.

By washing the grain and then cooking it after being treated to the germicide all of the latter left remaining in the grain is destroyed.

In order that the grain may not "bridge" and choke the cooker, an agitating-wheel $g^2$ is provided.

From the cooker $g$ the grain passes to a drier $h$, which consists of a series of overlying incline screens $h'$. These screens $h'$ are supported on suitable rollers on the sides of the drier, and each screen is connected to a vertical shaft $h^3$ by a link $h^4$ and an eccentric $h^5$, by which the said screens are given a vibratory movement, causing the grain to travel from screen to screen. A current of heated air is forced through the drier by the fan $i$. The grain falls from the lowest screen of the series to a conveyer $i'$, by which it is carried to a suitable mill, as indicated at $j$. The resulting product will vary in form and taste in accordance with the degree of fineness to which it is ground by the mill $j$ and the cereal from which it is produced; but whatever the texture of the product or the grain from which it is made the essential features will be the same, the result being a food product of a wholesome, palatable, and nutritious nature, free from all injurious impurities, easily prepared at a great saving of time, fuel, and trouble. It is a food product of great value to persons limited in time and facilities for cooking.

Having thus described my invention, I claim—

The method of preparing the cereal-food product herein described, which consists in treating the grain to a bath containing formaldehyde and thoroughly agitating the same while so treated, subjecting the grain to a rubbing action to remove the hulls and floating off the hulls, washing the hulled grain, cooking the whole hulled grain in a thorough manner so that the individual grains will be left practically intact or whole and so that any of the bath solution that may be left remaining in the grain after the washing operation will be eliminated or destroyed, drying the hulled and cooked grain, and then grinding the grain to a suitable degree of fineness, substantially as set forth.

JOSIAH B. ESPEY.

Witnesses:
M. E. REED,
H. D. LUTZ.